Jan. 22, 1957     C. L. MacGREGOR     2,778,271
OPHTHALMIC MOUNTINGS
Filed Oct. 30, 1951
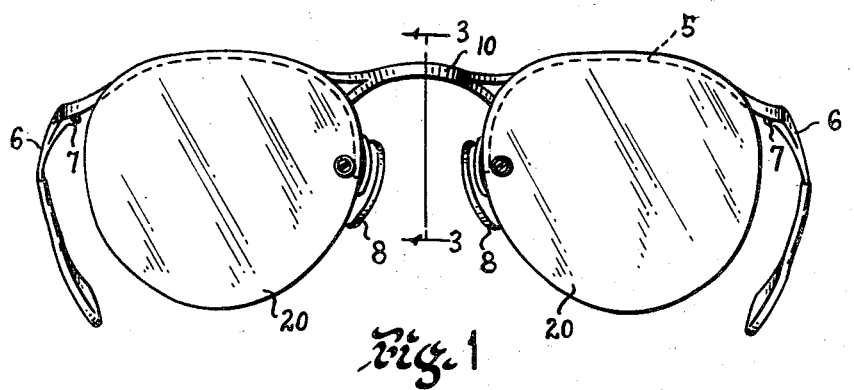
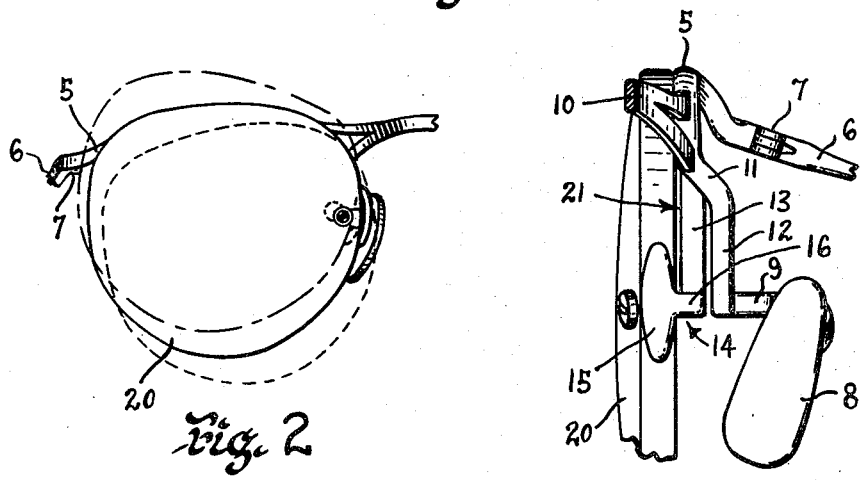
INVENTOR
CHARLES L. MACGREGOR
BY
Louis L. Gagnon
ATTORNEY

United States Patent Office 2,778,271
Patented Jan. 22, 1957

2,778,271

OPHTHALMIC MOUNTINGS

Charles L. MacGregor, Southbridge, Mass., assignor to American Optical Company, Southbridge, Mass., a voluntary association of Massachusetts Application October 30, 1951, Serial No. 253,812

1 Claim. (Cl. 88—47)

This invention relates to improvements in ophthalmic mountings and relates particularly to the provision of a mounting of the semi-frame type with novel means for resiliently connecting a pair of rimless type lenses thereto whereby shock or strain directed to the lenses will be relieved by said resilient means.

One of the principal objects of the invention is to provide a semi-frame type structure of the above character with resilient means for relieving shock and strain on the lenses which, in normal position of use, is substantially invisible and which, subsequent to being relieved of shock and strain, will tend to return and retain the lenses and the supporting structure in their initially aligned relation with each other.

Another object is to provide a lens supporting structure of the above character with resilient means made in the form of blade springs shaped to follow substantially the adjacent contour edges of the lenses and to follow adjacent portions of the lens supporting structure.

Another object is to provide an ophthalmic mounting of the above type wherein the supporting structure may be adjusted to the facial requirements of different individuals and into proper fitted relation with the lenses without altering the relation of the resilient means for supporting the lenses with respect to said supporting structure.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only is given by way of illustration.

Referring to the drawings:

Fig. 1 is a front elevational view of the mounting embodying the invention;

Fig. 2 is a fragmentary front elevational view illustrating the function of the resilient means of the mounting;

Fig. 3 is an enlarged fragmentary sectional view taken as on line 3—3 of Fig. 1 and looking in the direction indicated by the arrows; and Fig. 4 is a fragmentary exploded perspective view partially in section showing a portion of the bridge, temple and pad supporting arm and resilient means for connecting the lens strap to the supporting structure.

Referring more particularly to the drawings wherein like characters of reference designate like parts throughout the several views, the mounting embodying the invention comprises a pair of temple supporting arms 5 shaped to follow substantially the upper contour shape of the lenses and having temples 6 pivotally connected to the outer ends thereof, as illustrated at 7, and having nose pads 8 connected to the nasal ends thereof by pad supporting arms 9. The temple supporting arms 5 are connected by a central bridge member 10. The ends of the bridge 10 and the nose pad supporting arms 9 are secured to the arms 5 by solder or other suitable means.

Referring more particularly to Figs. 2, 3 and 4, it will be noted that the arms 5 are shaped to follow the inner shape of the lens to the point of attachment of the bridge 10. Below the bridge 10, the arm is bent rearwardly, as illustrated at 11, and thence downwardly, as illustrated at 12, to space said portion 12 from the rear surface of the lens. To the lower surface of the rearwardly extending portion 11, there is secured by solder or other suitable means a blade spring 13 which is shaped to follow the nasal contour edge of each respective lens. A lens strap 14 embodying a shoe 15 shaped to overlie and engage the edge of the lens and a perforated ear 16 shaped to overlie a side surface of the lens is secured to the lower end of the blade spring 13 by a rearwardly projecting portion 16 formed on said shoe 15. The perforation in the ear 16 is preferably provided with a threaded bore 17 adapted to receive a screw 18 which is extended through a washer 19 positioned on the opposed side of the lens and with the screw extending through a suitable opening formed in the nasal edge of each lens 20.

The shoe 15 is adjusted to have a rigid contact with the edge of the lens when the lens strap is connected therewith as described above. It is particularly pointed out that the blade spring 13, when connected with the arm 5, not only follows the adjacent contour shape of the nasal edge of the lens but is spaced slightly rearwardly thereof, as illustrated at 21. This blade spring 13 provides a long resilient support for the lens whereby the lens is free to flex, as diagrammatically illustrated in Fig. 2. The length of the spring 13 is also such as to permit a tortional function thereof to relieve strains imparted to the lens either from the rear or from the front. While the lens is supported with a free floating action, as described above, the spring is such as to return and retain the lens in proper aligned relation with the temple supporting arms 5 and other associated parts of the mounting under normal conditions of use.

This resilient supporting of the lens not only protects the lens against breakage when subjected to a sudden jar but also relieves strain at the lens strap connection thereby lessening the tendency of the lens to break at said point of connection.

The main supporting structure including the temple supporting arms 5, bridge and nose pad supporting arms may all be adjusted to the facial requirements of the individual and to proper aligned relation with the lenses and will retain said adjustments regardless of the resilient function of the blade spring 13. The blade spring 13, while relatively free to flex inwardly or outwardly in the plane of the lenses, as illustrated in Fig. 2, does provide a resilient tortional strain-relieving function when a force is imparted on said lenses from a forward or rearward direction with less tendency of having the lenses displaced from desired aligned relation with the mounting.

From the foregoing description, it will be seen that simple, efficient and economical means have been provided for absorbing shock and strain on the lenses with the said means being substantially inconspicuous when the mounting is in position of use.

Having described my invention, I claim:

A lens supporting structure for the lenses of an ophthalmic mounting, said structure comprising a pair of relatively rigid temple supporting bars shaped to follow rearwardly in adjacent relation with the upper edges of the lenses when assembled therewith, said temple supporting bars having temple connection means adjacent their temporal ends and having relatively rigid portions bent rearwardly and downwardly to form offset portions adjacent the upper nasal edges of the lenses and relatively rigid portions extending downwardly from said offset portions in rearwardly spaced and substantially parallel relation with the nasal sides of the lenses, a bridge connecting said relatively rigid temple supporting bars above said rearwardly bent portions and a pair of single downwardly extending relatively long and flat blade spring members each secured at the upper end thereof to each of said rearwardly bent portions with their side surfaces of greatest dimension disposed in substantially normal relation with and rearwardly of the plane of the lenses and being positioned between and spaced from the nasal sides of the lenses and from the rearwardly spaced downwardly extending portions of said temple supporting bars, said blade springs being shaped to follow the nasal contours of said lenses below the bridge in substantially parallel relation with said downwardly extending portions of the temple supporting bars, lens connection means secured adjacent the lower end of and extending forwardly of each of said blade springs and a rearwardly extending nose pad supporting arm secured adjacent the lower end of each of the relatively rigid downwardly extending nasal portions of the temple supporting bars, said blade springs having sufficient tension to normally retain the upper edges of the lenses, when connected thereto, in predetermined aligned relation with the temple supporting bars while being sufficiently resilient to permit flexing to provide a torsional strain relieving function when force is exerted on the lenses and said bridge connections with the temple supporting bars above said rearwardly bent portions permitting said relatively rigid downwardly extending portions to be adjusted independently of the blade springs to aid in fitting the pads to the nose of the wearer.

References Cited in the file of this patent

UNITED STATES PATENTS

| | | |
|---|---|---|
| 2,250,243 | Williams | July 22, 1941 |
| 2,349,764 | Sheldon | May 23, 1944 |
| 2,366,659 | Uhlemann et al. | Jan. 2, 1945 |
| 2,384,815 | Cozzens | Sept. 18, 1945 |